(12) United States Patent
Maenaka et al.

(10) Patent No.: US 9,142,846 B2
(45) Date of Patent: Sep. 22, 2015

(54) FUEL CELL SYSTEM AND FUEL CELL ACTIVATION METHOD

(75) Inventors: Takeshi Maenaka, Toyota (JP); Atsushi Imai, Gamagori (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1044 days.

(21) Appl. No.: 12/682,423

(22) PCT Filed: Sep. 25, 2008

(86) PCT No.: PCT/JP2008/067237
§ 371 (c)(1),
(2), (4) Date: Apr. 9, 2010

(87) PCT Pub. No.: WO2009/047980
PCT Pub. Date: Apr. 16, 2009

(65) Prior Publication Data
US 2010/0233557 A1    Sep. 16, 2010

(30) Foreign Application Priority Data
Oct. 10, 2007  (JP) ................................ 2007-264513

(51) Int. Cl.
*H01M 8/04* (2006.01)

(52) U.S. Cl.
CPC ...... *H01M 8/04223* (2013.01); *H01M 8/04089* (2013.01); *H01M 8/04679* (2013.01); *H01M 8/04753* (2013.01); *H01M 2250/20* (2013.01); *Y02E 60/50* (2013.01); *Y02T 90/32* (2013.01)

(58) Field of Classification Search
CPC .................... H01M 2250/20; H01M 8/04089; H01M 8/04223; H01M 8/04679; H01M 8/04753; Y02E 60/50; Y02T 90/32

USPC ......................................... 429/429
See application file for complete search history.

(56) References Cited

U.S. PATENT DOCUMENTS

| | | | |
|---|---|---|---|
| 2006/0166060 A1* | 7/2006 | Miura | 429/25 |
| 2007/0141404 A1 | 6/2007 | Skidmore et al. | |
| 2007/0148512 A1 | 6/2007 | Goto et al. | |
| 2007/0224473 A1 | 9/2007 | Suematsu et al. | |

FOREIGN PATENT DOCUMENTS

| | | | |
|---|---|---|---|
| CA | 2 632 963 A1 | 6/2007 | |
| JP | 2006-179469 A | 7/2006 | |
| JP | 2006-339080 A | 12/2006 | |
| JP | 2007-53000 A | 3/2007 | |
| JP | 2007-134200 A | 5/2007 | |
| JP | 2007-179826 A | 7/2007 | |
| JP | 2007179826 A | * 7/2007 | |

\* cited by examiner

*Primary Examiner* — Basia Ridley
*Assistant Examiner* — Heng Chan
(74) *Attorney, Agent, or Firm* — Kenyon & Kenyon LLP

(57) ABSTRACT

Whether a gas leakage occurs or not is accurately determined in a simple configuration. When receiving a request for activation of a fuel cell, a control unit opens a main shutoff valve to start hydrogen gas supply from a hydrogen tank to the fuel cell. The control unit thereafter performs gas leakage determination processing for a hydrogen piping system. If it is determined in the gas leakage determination processing that a gas leakage occurs, a gas leakage alert is output to stop the activation of the fuel cell. If it is determined in the gas leakage determination processing that a gas leakage does not occur, a compressor is activated to start oxidant gas supply to the fuel cell, and the fuel cell continues being operated.

5 Claims, 2 Drawing Sheets

FUEL CELL SYSTEM AND FUEL CELL ACTIVATION METHOD

This is a 371 national phase application of PCT/JP2008/067237 filed 25 Sep. 2008, which claims priority to Japanese Patent Application No. 2007-264513 filed 10 Oct. 2007, the contents of which are incorporated herein by reference.

TECHNICAL FIELD

The present invention relates to a fuel cell system and a method for activating a fuel cell.

BACKGROUND ART

In fuel cell systems, for example, in order to ensure security, it is necessary to monitor whether or not hydrogen gas (fuel gas) leaks from gas piping or a fuel cell. Meanwhile, while power is being generated in the fuel cell systems, hydrogen gas is being consumed in the fuel cell, so whether a gas leakage occurs or not needs to be determined by taking the amount of hydrogen gas consumption into consideration.

In the fuel cell system described in Patent Document 1 indicated below, whether a gas leakage occurs or not is determined based on an amount of gas difference which is obtained by subtracting, from the flow rate of hydrogen gas supplied to a gas supply flow path, an amount of hydrogen gas consumed in a fuel cell and an amount of variation of hydrogen gas flowing into a leakage-check flow path.

Patent Document 1: Japanese laid-open patent publication No. 2006-179469

DISCLOSURE OF THE INVENTION

Problem to be Solved by the Invention

The amount of hydrogen gas consumption varies due to various variable factors, and it is therefore difficult to carry out a calculation with high accuracy taking such variable factors into consideration. Accordingly, in order to accurately determine whether a gas leakage occurs or not by using the amount of hydrogen gas consumption, a complicated system configuration would be necessary.

The present invention has been made to solve the above-stated problem in the prior art, and an object of the invention is to provide a fuel cell system and fuel cell activation method that can accurately determine whether a gas leakage occurs or not in a simple configuration.

Means for Solving the Problem

In order to solve the above problem, a fuel cell system according to the present invention is a fuel cell system having a fuel cell that is supplied with fuel gas and oxidant gas and generates power from an electrochemical reaction, and this system has a control means that determines, upon activation of the fuel cell, whether or not a fuel gas leakage occurs in a fuel electrode side of the fuel cell after starting fuel gas supply to the fuel cell, and starts oxidant gas supply to the fuel cell after completing the determination.

Also, a fuel cell activation method according to the present invention is a fuel cell activation method in a fuel cell system having a fuel cell that is supplied with fuel gas and oxidant gas and generates power from an electrochemical reaction, the method including determining, upon activation of the fuel cell, whether or not a fuel gas leakage occurs in a fuel electrode side of the fuel cell after starting fuel gas supply to the fuel cell, and starting oxidant gas supply to the fuel cell after completing the determination.

According to the invention described above, upon activation of a fuel cell, whether a fuel gas leakage occurs or not can be determined from the time the supply of fuel gas to the fuel cell is started until the supply of oxidant gas is started. In other words, whether a fuel gas leakage occurs or not can be determined before the fuel cell consumes fuel gas. Accordingly, whether a fuel gas leakage occurs or not can be determined without taking the amount of fuel gas consumption in the fuel cell into consideration, and thus, whether a gas leakage occurs or not can be accurately determined in a simple configuration.

The above fuel cell system may further have a fuel supply flow path for supplying the fuel gas to the fuel cell from a fuel supply source that stores the fuel gas, and the control means may start the fuel gas supply by opening a valve provided in the fuel supply flow path and determine whether the fuel gas is leaked or not after closing the valve. Furthermore, in the above fuel cell system, the control means may start the oxidant gas supply by activating an oxidant gas supply source that supplies the oxidant gas to the fuel cell.

Effect of the Invention

According to the present invention, whether a gas leakage occurs or not can be accurately determined in a simple configuration.

DESCRIPTION OF REFERENCE NUMERALS

1 ... fuel cell system; 2 ... fuel cell; 3 ... oxidant gas piping system; 4 ... hydrogen gas piping system; 5 ... control unit; 21 ... current sensor; 30 ... filter; 31 ... compressor; 32 ... air supply flow path; 33 ... air exhaust flow path; 34 ... humidifier; 40 ... hydrogen tank; 41 ... hydrogen supply flow path; 42 ... circulation flow path; 43 ... main shutoff valve; 44 ... regulator; 45 ... first shutoff valve; 46 ... second shutoff valve; 47 ... hydrogen pump; 48 ... gas-liquid separator; 49 ... exhaust/drain valve; 50 ... exhaust flow path; 51 ... diluter; 91 ... DC/DC converter; 92 ... secondary battery; 93 ... traction inverter; 94 ... traction motor; and P1 ... pressure sensor.

BEST MODE FOR CARRYING OUT THE INVENTION

A preferred embodiment of the fuel cell system and fuel cell activation method according to the present invention will be described below with reference to the attached drawings. This embodiment explains the case where the fuel cell system according to the present invention is used as an on-vehicle power generation system for a fuel cell vehicle (FCHV: Fuel Cell Hybrid Vehicle).

The fuel cell system according to the present invention is characterized in that, at the time of activation of a fuel cell, whether a fuel gas leakage occurs or not is determined from the time the supply of fuel gas to the fuel cell is started until the supply of oxidant gas is started, and as a result, whether a gas leakage occurs or not can be accurately determined in a simple configuration. Examples of the time of activation of the fuel cell include the time of starting up the engine and the time of returning from an intermittent operation mode to a normal operation mode. In other words, the above time indicates the time when the supply of reactant gases (oxidant gas and fuel gas) to the fuel cell is started or restarted after being in a stop or standby state.

Figure 1:
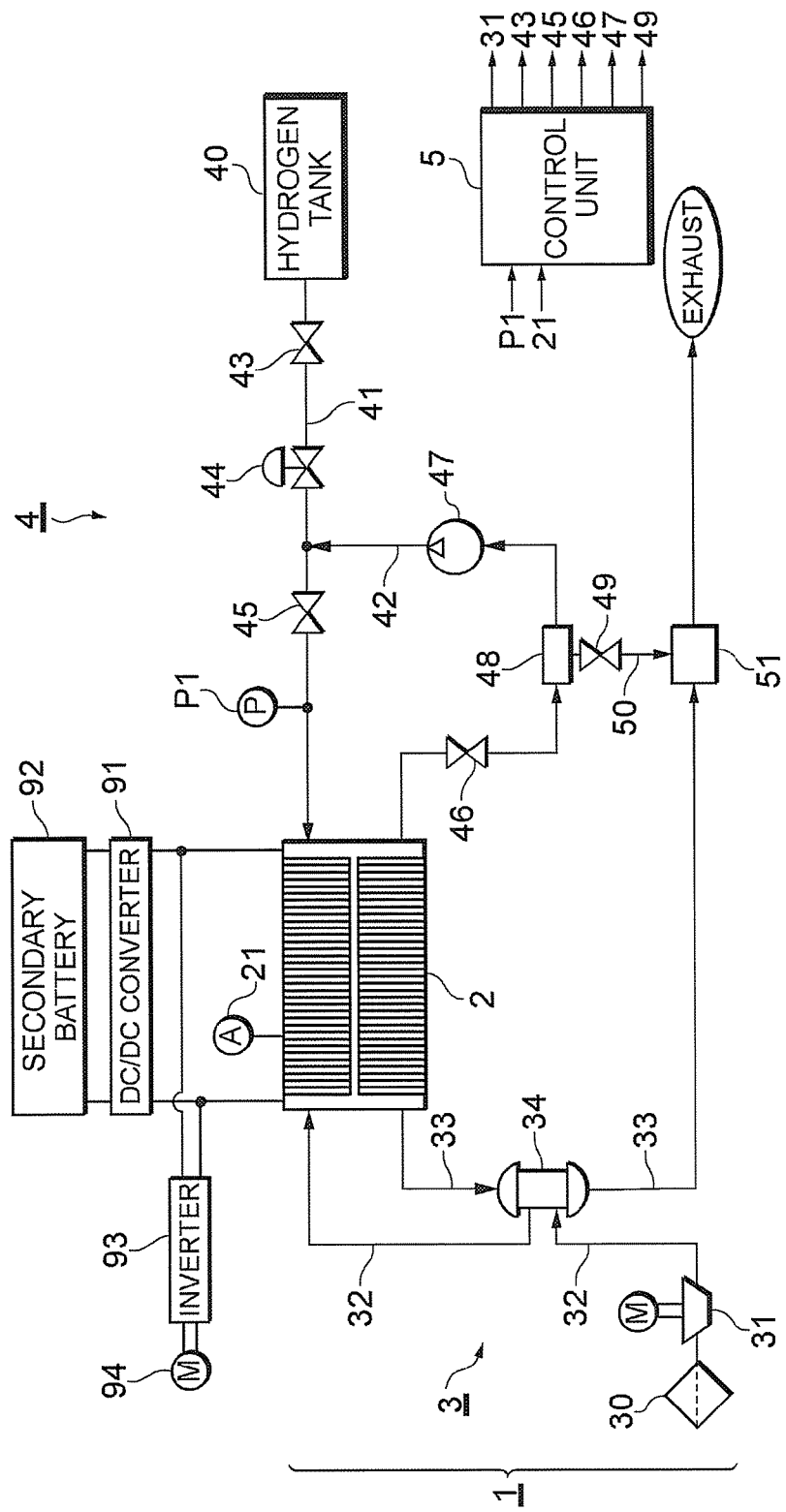
FIG. 1 is a configuration diagram schematically illustrating a fuel cell system according to an embodiment.

Referring first to FIG. 1, the configuration of the fuel cell system according to this embodiment will be explained. FIG. 1 is a configuration diagram schematically illustrating the fuel cell system according this embodiment.

As shown in FIG. 1, a fuel cell system 1 has: a fuel cell 2 that is supplied with reactant gases of oxidant gas and fuel gas and generates power from an electrochemical reaction; an oxidant gas piping system 3 for supplying the fuel cell 2 with air as oxidant gas; a hydrogen gas piping system 4 for supplying the fuel cell 2 with hydrogen as fuel gas; and a control unit 5 that performs overall control of the entire system.

The fuel cell 2 has a stack structure formed of a plurality of layered unit cells that are supplied with reactant gases and generate power. The DC power generated by the fuel cell 2 is in part transformed by a DC/DC converter 91 to have a reduced voltage, and a secondary battery 92 (battery) is charged with that power. A traction inverter 93 converts the DC power supplied from both, or either one of, the fuel cell 2 and the secondary battery 92, to the AC power, and supplies the AC power to a traction motor 94. The fuel cell 2 is provided with a current sensor 21 for detecting the current that is being generated.

The oxidant gas piping system 3 has: a compressor 31 (oxidant gas supply source) that compresses oxidant gas taken in from the atmosphere through a filter 30 and then transmits the gas; an air supply flow path 32 for supplying oxidant gas to the fuel cell 2; and an air exhaust flow path 33 for exhausting oxidant-off gas exhausted from the fuel cell 2. The air supply flow path 32 and the air exhaust flow path 33 are provided with a humidifier 34 that humidifies the compressed oxidant gas transmitted from the compressor 31 by using the oxidant-off gas exhausted from the fuel cell 2. The oxidant-off gas is, after being subjected to moisture exchange, etc., by the above humidifier 34, finally exhausted out of the system as exhaust gas into the atmosphere.

The hydrogen gas piping system 4 has: a hydrogen tank 40 serving as a fuel supply source that stores high pressure (e.g., 70 MPa) hydrogen gas; a hydrogen supply flow path 41 serving as a fuel supply flow path for supplying the hydrogen gas in the hydrogen tank 40 to the fuel cell 2; and a circulation flow path 42 for flowing hydrogen-off gas exhausted from the fuel cell 2 back to the hydrogen supply flow path 41. Note that the hydrogen gas piping system 4 is an embodiment of a fuel supply system according to the present invention. Instead of the hydrogen tank 40 in this embodiment, for example, a reformer that reforms a hydrocarbon-type fuel into a hydrogen-rich fuel gas utilizing steam and a high-pressure gas tank that pressurizes and accumulates the fuel gas reformed by the reformer may also be used as a fuel supply source. Alternatively, a tank having a hydrogen-absorbing alloy may also be used as a fuel supply source.

The hydrogen supply flow path 41 includes: a main shutoff valve 43 (valve) that blocks or accepts hydrogen gas supply from the hydrogen tank 40; a regulator 44 that regulates the pressure of hydrogen gas to a predetermined secondary pressure; and a first shutoff valve 45 (valve) that blocks or accepts hydrogen gas supply from the hydrogen supply flow path 41 to the fuel cell 2. Also, a pressure sensor P1 that detects the pressure of hydrogen gas in the hydrogen supply flow path 41 is provided downstream of the first shutoff valve 45.

The circulation flow path 42 includes: a second shutoff valve 46 (valve) that blocks or accepts hydrogen-off gas outflow from the fuel cell 2 to the circulation flow path 42; and a hydrogen pump 47 that pressurizes hydrogen-off gas in the circulation flow path 42 and transmits it toward the hydrogen supply flow path 41 side. Also, an exhaust flow path 50 is connected to the circulation flow path 42 via a gas-liquid separator 48 and an exhaust/drain valve 49. The gas-liquid separator 48 collects water from hydrogen-off gas. Based on the commands from the control unit 5, the exhaust/drain valve 49 discharges (purges) the water collected by the gas-liquid separator 48 and the hydrogen-off gas containing impurities in the circulation flow path 42. The hydrogen-off gas exhausted from the exhaust/drain valve 49 is diluted by a diluter 51, and then joins the oxidant-off gas in the air exhaust flow path 33.

The control unit 5 detects a manipulated amount of an accelerating member (e.g., accelerator) provided in the fuel cell vehicle, receives control information, such as a required amount of acceleration (for example, a power generation amount required by a power-consuming device, such as the traction motor 94), and controls the operation of various devices in the system. Examples of the power-consuming device include, other than the traction motor 94, auxiliary devices (e.g., motors for the compressor 31 and the hydrogen pump 47) necessary for the operation of the fuel cell 2, actuators used in various devices related to driving a vehicle (transmission, wheel controller, steering device, suspension, etc.), and an air conditioning device (air conditioner), lighting device, audio system, etc., for the passenger space.

Upon activation of the fuel cell 2, the control unit 5 controls "fuel cell activation processing" whereby whether a gas leakage occurs or not is determined by supplying the fuel cell 2 with hydrogen gas and the fuel cell 2 is supplied with oxidant gas after the completion of the above determination. More specifically, upon activation of the fuel cell 2, the main shutoff valve 43 is first opened to start hydrogen gas supply from the hydrogen tank 40 to the fuel cell 2. Then, gas leakage determination processing (explained later) for the hydrogen gas piping system 4 is performed. As a result of the gas leakage determination processing, if it is determined that no gas leakage occurs, the compressor 31 is activated to start oxidant gas supply to the fuel cell 2. As a result, the fuel cell system 1 starts to be operated.

Here, as to the process of activating the fuel cell 2, other than the process of starting the supply of oxidant gas after starting the supply of hydrogen gas, which is employed in this embodiment, a process of starting the supply of hydrogen gas after starting the supply of oxidant gas, and a process of starting the supply of oxidant gas and hydrogen gas simultaneously are also possible. However, in those processes, power generation is carried out in the fuel cell 2 immediately after the supply of hydrogen gas is started, resulting in electric current being generated in the fuel cell 2 and the hydrogen gas supplied to the fuel cell 2 being consumed. Thus, when activating the fuel cell 2 and determining whether a gas leakage occurs or not according to those processes, the amount of hydrogen gas consumption must be taken into consideration.

In contrast, upon activation of the fuel cell 2, the control unit 5 in this embodiment starts the supply of oxidant gas after starting the supply of hydrogen gas and determines whether a gas leakage occurs or not from the start of the hydrogen gas supply until the start of the oxidant gas supply. Power generation is not carried out in the fuel cell 2 from the start of the hydrogen gas supply until the start of the oxidant gas supply, so no current is generated in the fuel cell 2. Accordingly, the fuel cell system 1 in this embodiment does not need to take the amount of hydrogen gas consumption into consideration when determining whether a gas leakage occurs or not upon activation of the fuel cell 2, and can consequently achieve an accurate gas leakage determination.

For the above-mentioned gas leakage determination processing, various types of gas leakage determination processing employed in the prior-art fuel cell systems may be used. For example, the following gas leakage determination processing may be used. First, the change in pressure of a closed space formed between the first shutoff valve 45 and the second shutoff valve 46 by closing the first shutoff valve 45 and the second shutoff valve 46 is detected using the pressure sensor P1, and the detection results are used to measure the amount of gas leakage. If the measured amount of gas leakage is greater than a preliminarily stored threshold value, it is determined that a hydrogen gas leakage occurs in the hydrogen gas piping system 4. On the other hand, if the amount of gas leakage is equal to or smaller than the preliminarily stored threshold value, it is determined that a hydrogen gas leakage does not occur in the hydrogen gas piping system 4.

Here, the control unit 5 physically has, for example, a CPU, a ROM and HDD for storing control programs and control data processed by the CPU, a RAM mainly used as various work areas for control processing, and an I/O interface. These components are connected to each other via a bus. Various sensors including the pressure sensor P1 are connected to the I/O interface, and various drivers for driving the compressor 31, main shutoff valve 43, first shutoff valve 45, second shutoff valve 46, hydrogen pump 47, exhaust/drain valve 49, etc., are also connected to the I/O interface.

In accordance with the control programs stored in the ROM, the CPU receives the results of detection in the pressure sensor P1 through the I/O interface, processes them using various data, etc., in the RAM, and thereby determines whether or not a gas leakage occurs in the hydrogen gas piping system 4. Also, the CPU outputs control signals to various drivers through the I/O interface, and thereby controls the entire fuel cell system 1.

Figure 2:
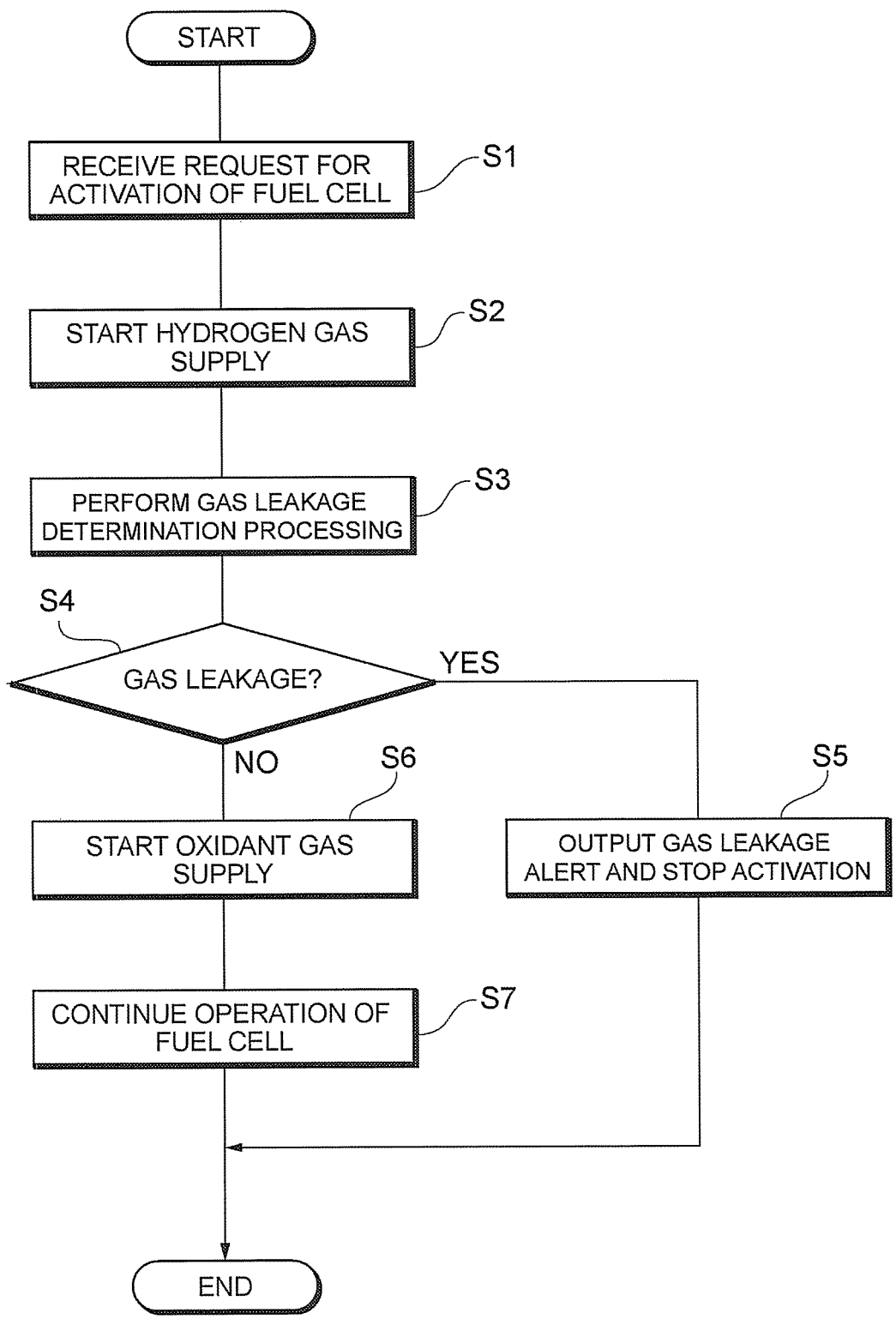
FIG. 2 is a flowchart for explaining fuel cell activation processing in the fuel cell system shown in FIG. 1.

Next, the processing for activating the fuel cell 2 in this embodiment will be explained using the flowchart shown in FIG. 2.

First, the control unit 5 receives a request for activation of the fuel cell 2, for example, when the ignition switch is turned on, or when a predetermined return condition is satisfied during an intermittent operation (step S1). After that, the control unit 5 opens the main shutoff valve 43 to start hydrogen gas supply from the hydrogen tank 40 to the fuel cell 2 (step S2).

Then, the control unit 5 performs the gas leakage determination processing for the hydrogen gas piping system 4 (step S3). If it is determined in the gas leakage determination processing that a gas leakage occurs (step S4; YES), the control unit 5 outputs a gas leakage alert and stops the activation of the fuel cell 2 (step S5).

On the other hand, if it is determined in the above gas leakage determination processing that a gas leakage does not occur (step S4; NO), the control unit 5 activates the compressor 31 to start oxidant gas supply to the fuel cell 2 (step S6), and continues the operation of the fuel cell 2 (step S7).

In the above-described fuel cell activation processing, the activation of the fuel cell 2 is stopped if it is determined that a gas leakage occurs (step S4; YES), but activation is not necessarily stopped. For example, inspections, etc., may be performed depending on the amount of gas leakage so as to check predetermined items for the activation/operation of the fuel cell 2, and the fuel cell 2 may continue being operated if no problems are found.

As described above, according to the fuel cell system 1 in this embodiment, upon activation of the fuel cell 2, whether a gas leakage occurs or not can be determined from the time the supply of hydrogen gas to the fuel cell 2 is started until the supply of oxidant gas is started. In other words, whether a gas leakage occurs or not can be determined before the fuel cell 2 consumes hydrogen gas. Accordingly, whether a gas leakage occurs or not can be determined without taking the amount of hydrogen gas consumption in the fuel cell 2 into consideration, and thus, whether a gas leakage occurs or not can be accurately determined in a simple configuration.

While the above embodiment explains the case where a fuel cell vehicle is equipped with the fuel cell system according to the present invention, various mobile objects other than fuel cell vehicles (robots, ships, planes, etc.) can also be equipped with the fuel cell system according to the present invention. Furthermore, the fuel cell system according to the present invention can also be utilized in fixed power generation systems used as power generation equipment in buildings (houses, office buildings, etc.).

INDUSTRIAL APPLICABILITY

The fuel cell system and fuel cell activation method according to the present invention are suitable for use in determining whether a gas leakage occurs or not in a simple configuration with high accuracy.

The invention claimed is:

1. A fuel cell system having a fuel cell that is supplied with a fuel gas and an oxidant gas and generates power from an electrochemical reaction, the system comprising a control unit programmed to:
    determine, upon activation of the fuel cell, whether or not a fuel gas leakage occurs in a fuel electrode side of the fuel cell after starting a fuel gas supply to the fuel cell while maintaining a state of not removing current from the fuel cell, but before starting an oxidant gas supply to the fuel cell, and
    start the oxidant gas supply to the fuel cell based on the determination.

2. The fuel cell system according to claim 1, further comprising a fuel supply flow path for supplying the fuel gas to the fuel cell from a fuel supply source that stores the fuel gas,
    wherein the control unit starts the fuel gas supply by opening a valve provided in the fuel supply flow path and determines whether the fuel gas leakage occurs or not after closing the valve.

3. The fuel cell system according to claim 1, wherein the control unit starts the oxidant gas supply by activating an oxidant gas supply source that supplies the oxidant gas to the fuel cell.

4. A fuel cell activation method in a fuel cell system having a fuel cell that is supplied with a fuel gas and an oxidant gas and generates power from an electrochemical reaction, the method comprising:
    determining, by a control unit, upon activation of the fuel cell, whether or not a fuel gas leakage occurs in a fuel electrode side of the fuel cell after starting a fuel gas supply to the fuel cell while maintaining a state of not removing current from the fuel cell, but before starting an oxidant gas supply to the fuel cell, and
    starting the oxidant gas supply to the fuel cell based on the determination.

5. The fuel cell system according to claim 1, wherein, in the determination, if it is determined that a fuel gas leakage occurs, the control unit outputs a gas leakage alert and stops activating the fuel cell, and if it is determined that a fuel gas leakage does not occur, the control unit starts the oxidant gas supply to the fuel cell and continues operating the fuel cell.

\* \* \* \* \*